United States Patent [19]

Henry et al.

[11] Patent Number: 5,224,064
[45] Date of Patent: Jun. 29, 1993

[54] TRANSCENDENTAL FUNCTION APPROXIMATION APPARATUS AND METHOD

[75] Inventors: Matthew R. Henry; Gregory M. Martin, both of Albuquerque, N. Mex.

[73] Assignee: Honeywell Inc., Minneapolis, Minn.

[21] Appl. No.: 728,445

[22] Filed: Jul. 11, 1991

[51] Int. Cl.⁵ .............................................. G06F 7/38
[52] U.S. Cl. ........................................................ 364/729
[58] Field of Search .................................. 364/729, 721

[56] References Cited

U.S. PATENT DOCUMENTS 4,171,537 10/1979 Weissberger et al. .......... 364/729 X
4,809,205 2/1989 Freeman ......................... 364/729 X

OTHER PUBLICATIONS

*Evaluating Elementary Functions with Chebyshev Polynomials on Pipeline Nets,* IEEE Computer Society Proceedings of the 8th Symposium on Computer Arithmetic, 1987, pp. 121-128, M. J. Irwin Ed.
*The CORDIC Trigonometric Computing Technique,* IEEE Transactions on Electronic Computing EC-8; pp. 330-334, 1959.

*Primary Examiner*—Tan V. Mai
*Attorney, Agent, or Firm*—Ronald E. Champion; George A. Leone, Sr.

[57] ABSTRACT

Transcendental function approximation using a regional approximation look-up table, offset lookup table, scaling shifter and interpolation adder/subtractor. Rapid fixed-point arithmetic calculations can be accomplished which approximate values of transcendental functions to a predetermined accuracy. An N bit argument is used to produce an N bit result allowing the placement of the radix point in the two numbers to be different. Different parts of the input argument are fed in parallel to the regional approximation look-up table and the offset lookup table. A scaling shifter converts the output of the offset lookup table and regional lookup table to a result usable by the interpolation adder/subtractor processor. The regional approximation lookup table also provides information to the interpolation processor which provides the N bit approximation.

20 Claims, 4 Drawing Sheets

☐☐☐☐ POSSIBLE PIPELINE REGISTER LOCATIONS

TRANSCENDENTAL FUNCTION APPROXIMATION APPARATUS AND METHOD

This invention relates to an apparatus and method of transcendental function approximation and more particularly to a method of approximating a function using a segmented approximation technique.

BACKGROUND OF THE INVENTION

Prior art functional approximation methods have fallen into three general categories: lookup table approaches, polynomial techniques like the Chebyshev Series, and an approach called the CORDIC approach or conversion transformations. Each approach suffers serious drawbacks with respect to the amount of computational resources required to implement them or the amount of time required to complete the implementation of the approach. The lookup table approach suffers from the requirement that a relatively large amount of hardware needs to be dedicated to the implementation of the approach to effectively exploit the inherent speed improvements found in the look up table approach. The Chebyshev approach is applicable for fixed and floating point arithmetic. However, the Chebyshev approach suffers from the need for high computational capabilities. High computational capabilities imply relatively large amounts of hardware or high clock speeds or both. This hardware requirement makes the Chebyshev approach generally over burdensome for fixed point arithmetic. Similarly, the CORDIC approach suffers time, complexity and space constraints. The CORDIC approach utilizes an iterative solution to the approximation problem that is hardware intensive.

Lookup table approaches depend on the accessing of a memory location for each argument to be approximated. Thus the resolution and accuracy of lookup table methods depend heavily on the amount of memory being dedicated. Thus a 4K byte memory having 8 bits per byte would be able to represent 4 thousand different arguments regardless of the type of argument addressing. Each resultant would contain at most 256 different values.

The Chebyshev polynomial evaluation method allows the approximation of vector-valued elementary functions for real time applications. A scale function evaluator using Chebyshev approximation consists of three components as described in a paper by Kai Hwang, H.C. Wang and Z. Xu entitled "Evaluating Elementary Functions With Chebyshev Polynomials On Pipeline Nets" in the IEEE Computer Society Proceedings of the 8th Symposium on Computer Arithmetic 1987, pp. 121-128 M.J. Irwin Ed. As explained in Hwang, et al the preprocessing unit preforms range reduction on the incoming data arguments; the Chebyshev approximator evaluates the truncated Chebyshev series and the postprocessing unit restores the function values with respect to the original arguments. The preprocessing and postprocessing tasks are complementary and closely interrelated. They are also function dependent.

The Coordinate Rotational Digital Computer(CORDIC) is a special-purpose digital computer for real-time airborne computation. The computer was developed for the solution of trigonometric relations involved in plane coordinate rotation and conversion from rectangular to polar coordinates. The CORDIC computer consisted of three shift registers, three adder-subtractors, and special interconnections. The CORDIC computing technique was developed especially for use in real-time digital computing environments involving discontinuous, programmed solutions of trigonometric relationships.

The CORDIC approach implemented the digital equivalent of an analog resolver. Computation is divided between a rotation mode and vectoring mode. In the rotation mode the coordinate components of the original vector after rotation through a given angle, is computed. In vectoring mode the coordinate components of the vector are given and the magnitude and angular argument of the original vector are computed. In vectoring mode, rotation and feedback are utilized. The original coordinates are rotated until the angular argument is zero. In the CORDIC approach the basic computing technique is a step-by-step sequence of pseudo rotations which result in an over-all rotation through a given angle or result in a final angular argument of zero. A good description of the CORDIC computing method can be found in an article by Jack E. Volder entitled "The CORDIC Trigonometric Computing Technique", IRE Transactions on Electronic Computing EC-8: pages 330-334 (1959).

It is therefore the motivation of the invention to provide a transcendental function approximation technique that reduces the amount of memory and computational hardware needed to approximate a transcendental function without compromising the speed or accuracy of the approximation.

SUMMARY OF THE INVENTION

The invention rapidly computes approximations to transcendental functions within a fixed-point arithmetic system. The invention accepts an N bit argument and produces an N bit result allowing the placement of the radix point in the n-bit argument and N bit result to be different. The function can evaluated over a domain of N bit arguments. Each N bit argument is divided into a P bit offset argument and a L bit argument. The L bit argument forms the address to a regional approximation lookup table. The P bit offset forms the address to an offset lookup table. The contents of the regional approximation lookup table are determined by first precisely evaluating the function at the N bit argument and forming a regional approximation. Additional information is stored in the regional approximation lookup table that indicates the Q bit profile index and the R bit shift count. The contents of the offset lookup table are determined by generating a set of offsets for each element of the domain. This set is called a profile. The output of the offset lookup table is scaled by shifting by $2^R$ bits. Based on an additional sign magnitude bit the result of the shifted offset is added or subtracted from the N bit regional approximation output from the regional approximation lookup table.

The invention provides a method of reducing the number of offsets stored in the offset lookup table. Using an exhaustive search mechanism all possible combinations of Q bit profile index and R bit shift counts are tried. In one embodiment of the invention only redundant offset entries are collapsed. In an alternative embodiment of the invention offset entries are removed if they do not effect the accuracy by more than a predetermined amount of error.

Initial values of N are determined by the numbering system being used. Initial values of P and L are determined by the desired accuracy of the result. The initial value of Q is set to L to permit precise approximation. Initially R is set to zero to provide for an unshifted offset for adding or subtracting.

Improvements in memory size and approximation accuracy are determined by 'trial and error' and numerical analysis of the method of functional approximation of the invention for different values of system parameters.

It is an object of the invention to provide an improved apparatus and method to compute trigonometric functions and their inverses, square-roots, logarithms, and exponentials.

It is another object of the invention to provide an improved apparatus and method to support direct conversion from one transcendental function argument to another result.

It is yet another object of the invention to provide an improved apparatus and method for transcendental function approximation that achieves near-optimal approximation results within a given number system.

It is a further object of the invention to provide an improved apparatus and method for transcendental function approximation that minimizes look-up table size.

It is still a further object of the invention to provide an improved apparatus and method of transcendental function approximation that minimizes calculation delay.

Other objects, features and advantages of the present invention will become apparent to those skilled in the art through the Description of the Preferred Embodiment, claims, and drawings herein wherein like numerals refer to like elements.

BRIEF DESCRIPTION OF THE DRAWINGS

To illustrate this invention, a preferred embodiment will be described herein with reference to the accompanying drawings. The preferred embodiment concerns a transcendental function approximation method and apparatus.

DESCRIPTION OF THE PREFERRED EMBODIMENT

Figure 1:
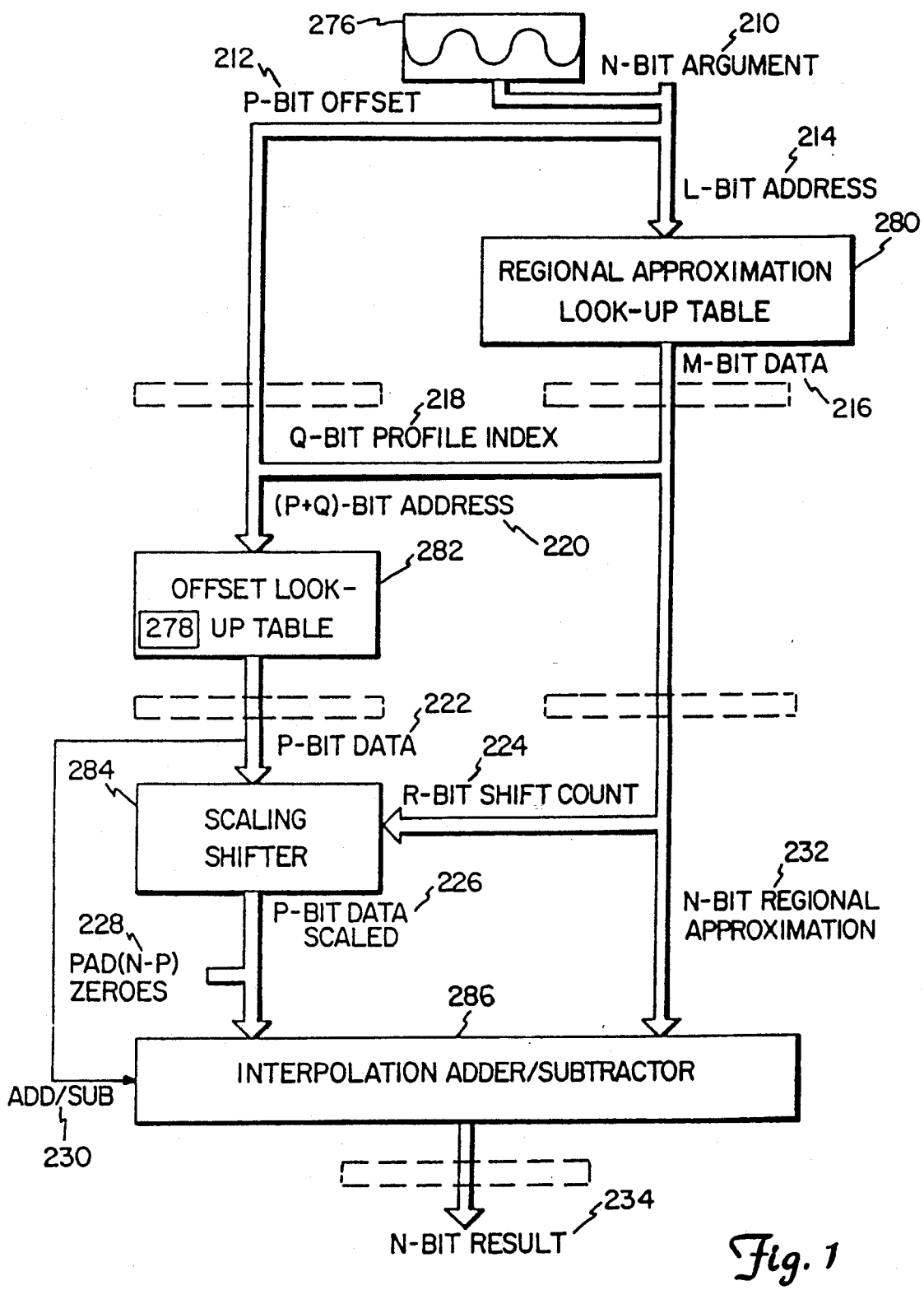
FIG. 1 shows a schematic block diagram of the method of the invention.

Now referring to FIG. 1 which shows a schematic block diagram of the method and apparatus of the invention. To understand the function approximation method of the invention the nature of the N bit argument 210, P bit offset 212, L bit address 214, M bit data 216, Q bit profile index 218, R bit shift count 224, (P+1) bit data 222, sign magnitude 230, P bit data 223, P bit scaled data 226, N bit regional approximation 232 and N bit result 234 values will be described.

The function 276 to be approximated is evaluated over a domain of values. The N bit argument 210 represents $2^N$ possible domain values where each bit is a binary bit. Those skilled in the art will recognize that the function 276 approximation method of the invention could work with bits representing any base. The object of the invention is to approximate the value of the function 276 at the N bit argument 210. The value of the function 276 at the N bit argument is called the N bit result 234. The value chosen for N is based on the numbering system used in the implementation of the invention.

The L bit value 214 is the L most significant bits of the N bit argument 210. The L bit value is used as an address to a regional approximation lookup table 280. The regional approximation lookup table 280 stores an N bit approximation 232 of the function 276 to be evaluated, a Q bit profile index 218, and a R bit shift count 224 for each of the $2^N$ N bit arguments. The initial value of L is determined by heuristics and improved by numerical analysis both being dependent on the numbering system in use, the desired accuracy of the approximation and the results of trial and error testing of the method of the invention.

The P bit value 212 is the P least significant bits of the N bit argument 210. The P bit value 212 is used as an address to an offset lookup table 282. The offset lookup table 282 contains $2^Q$ sets of offsets, each set of offsets is called a profile. Each set of offsets, profiles, contains $2^P$ values. The initial value of P is determined in a similar manner to the value of L..since L plus P equals N by definition. The value of P is interpreted to be a selection of a particular member of a profile.

The M bit value is the data output of the regional approximation lookup table 280. Each element of the function's 276 domain has an associated M bit value. The output of the regional approximation lookup Table 280 is an M bit number 216 broken into an N bit regional approximation 232, an R bit shift count value 224 and a Q bit profile index 218. The method of improving the predetermined values of R and Q is shown below by reference to the numerical analysis of FIG. 4.

The Q bit value is an index to the offset lookup-table 282. The full address of the offset lookup table 282 is formed by the concatenation of the Q bit profile index value 218 and the P bit offset value 212 forming the (P+Q) bit address 220. Initially Q is assumed to be as large as L so that there are as many profiles in the offset lookup table 282 as there are elements of the regional approximation lookup table 280.

The P bit data offset and the sign magnitude values are output from the offset lookup table 282 for each (P+Q) bit address.

The sign magnitude bit 230 indicates to the interpolation adder/subractor 286 of the method of the invention whether to add or subtract the scaled offset from the scaling shifter 284.

The N bit regional approximation 232 is the un-offset regional approximation of the function 276 read from the regional approximation lookup table 280.

The N bit result 234 is computed as the sum or difference of the N bit regional approximation and the P bit scaled data value 226 depending on the state of the sign magnitude bit.

The method of function approximation of the invention begins by accepting the N bit argument 210 representing one element of the domain. The N bit value 210 is an argument to the function 276 to be approximated wherein the N bit argument 210 can attain $2^N$ different values in the binary numbering system where the value of N is determined by the numbering system in use. The function 276 to be approximated could be a transcendental function but any function or relation or combination of functions or relations could also be approximated.

The argument's 210 L most significant bits 214 provides an addressing scheme for the transcendental function approximation method of the invention. The invention provides a way of adjusting, using a predetermined size for N and L, the accuracy and resolution of the method. A change in the size of L effects the resolution of the method and the amount of memory needed to implement the method. An increase in the size of the L bit address 214 by one bit will double the subsequent resolution of the approximation at the expense of doubling the memory size needed to realize the regional approximation lookup table 280. The regional approximation lookup table 280 provides a regional approximation 232 for a particular predetermined function 276.

Figure 2A:
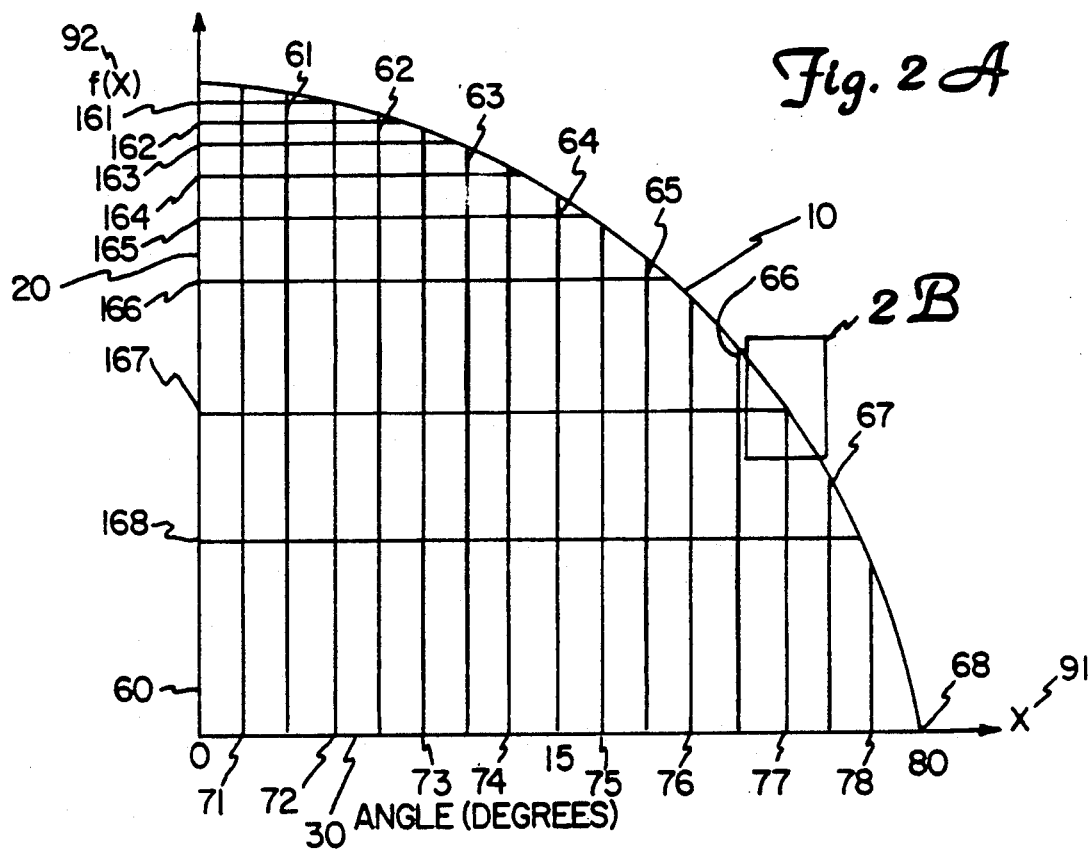
FIG. 2A shows one example of the method of the invention used to approximate a transcendental function.

The method of determining the contents of the regional approximation lookup table 280 can be illustrated by referring to FIG. 1 and FIG. 2A. In FIG. 2A a portion of a transcendental function 10 is graphically shown being approximated with the method of the invention. In FIG. 2 the estimation range of the cosine function 10 is divided into 8 equal segments over the interval 0 to 90 degrees. The figure shows the first quadrant of a cosine function 10 in which the region under the curve defined by the function 10 is segmented by lines 60, 61, 62, 63, 64, 65, 66, and 67. The displacement angle 30 in degrees is given along the x axis of the graph. The cosine function f(x) 10 is given along the y axis of the graph. The method of the invention approximates the cosine function 10 storing a regional approximation 160, 161, 162, 163, 164, 165, 166, 167 and 168 for each segment in the regional approximation lookup table 280. The address values of the regional approximation lookup table 280 correspond to points on the x-axis 91, points 72, 73, 74, 75, 76, 77 and 78. By definition the regional approximations of f(x) 92, in this example the cosine function 10, are taken at the midpoint of each segment. The N bit address 210 therefore corresponds to the N bit address of the regional approximation lookup table 280 corresponding to the midpoint values 71, 72, 73, 74, 75, 76, 77, 78 and 79. The N bit regional approximation, 232 in FIG. 1, therefore corresponds to the N bit regional approximation corresponding to the data values 161, 162, 163, 164, 165, 166, 167 and 168.

The example given in FIG. 2A shows an example of the transcendental function approximation method of the invention used to approximate the cosine function 10 between 0 and 90 degrees. Those skilled in the art will appreciate that the function chosen and range of approximation are by way of example and not limitation. In the example shown in FIG. 2A the interval between 0 and 90 degrees is broken up into $2^L$ segments, where L is 3. This data value represents the L bit address 214 to the regional approximation lookup table 280.

Figure 2B:
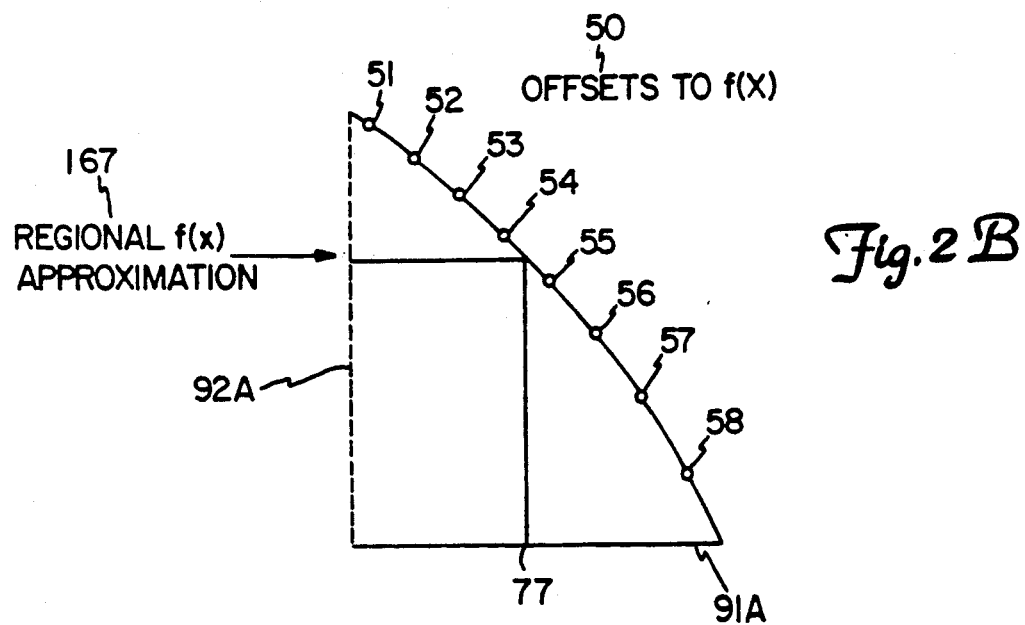
FIG. 2B shows a more detailed aspect of the transcendental approximation the method of the invention.

Now referring to FIG. 1 and FIG. 2B which shows the offset method of the function approximation method of the invention. In general the offset will be shifted and applied to the regional approximation. The regional approximation 167 of the function f(x) 92 is shown on the f(x)-axis 92, the midpoint N bit argument representation 57 is shown on the x-axis 91. Offsets are defined at 51, 52, 53, 54, 55, 56, 57, and 58. At each regional approximation, 167 for example, the approximation of the function can be improved by providing a compensating value, or an offset. This offset can be calculated by comparing the relative magnitude of the address of the regional approximation 77 with the more correct address of the value of the function. Thus in the example of FIG. 2B the points 51, 52, 53, and 54 will provide a positive offset and points 55, 56, 57, and 58 will provide a negative offset. Once the offset is determined the approximation of the function will undergo an additional 'profile' transformation.

The profile of each segment is defined as a mapping from a P bit offset to a functional f(x) 92 offset. The profile for each segment varies with the shape of f(x) 92 within that segment. As a result an additional profile index is needed to select different profiles for different regional approximations 167.

The actual values stored in the offset lookup table 282 are determined by the following steps. Initially a precise function value for each set of the $2^P$ elements for each one of the elements of the domain is computed and stored. Then the middle value for each set is computed. The difference between each precise value and the middle value is computed. If the middle value is greater than the precise value then the offset needs to be subtracted, the corresponding sign magnitude will be set to indicate a subtraction. If the middle value is less than the precise value then the offset needs to be added, the corresponding sign magnitude will be set to indicate an addition. The difference values are then rounded to the Pth bit for storage in the offset lookup table.

The value of Q or the curvature profile for a particular transcendental function segment is determined from numerical analysis. Q bits select one of $2^Q$ possible curvature profiles in the offset lookup table 282. Those skilled in the art will appreciate that the number of curvature profiles required for the approximation of any particular function will vary with the desired accuracy and the relative shape of the functions over a given interval. Initially the number of profiles are equal to the number of elements of the domain or the number of possible arguments to the function approximator. This initial number of profiles provides a unique profile for each approximation. Depending on the type and nature of the function to be evaluated there is the possibility that profiles may be reused. Additionally, certain profiles may be reused simply by a performing a scaling prior to use. These two features of the invention substantially reduce the amount of memory needed to implement the invention.

In the numerical analysis method of the invention the offset lookup table is first scanned for redundant entries which are subsequently eliminated.

In an alternative embodiment of the approximation method of the invention the offset 222 is scaled allowing a decrease in the number of profiles that need to be stored in the offset lookup table 282. Scaling by shifting provides a power of two increase or decrease in the magnitude of the offset depending on the predetermined meaning of the shift. R bits 224 select a scaling bit shift for the P bit offset 212 from the offset lookup table 282. This increases the apparent number of curvature profiles by expanding or compressing them over the interpolation interval. Those skilled in the art will appreciate that the method of scaling by shifting is by way of illustration and not limitation and that specifically different types of scaling may be used to modify a profile.

The offset lookup table 282 uses the P bit offset 212 from the input argument and the Q bit profile index 218 from the regional approximation lookup Table 280 to produce a P bit value 212 and a single-bit sign magnitude value. The offset lookup table 282 may be viewed as a "codebook" of curve sections which fit different intervals of the transcendental function.

The Scaling Shifter 284 accepts a P bit value 222 from the offset lookup table 282 and an R bit value from the regional approximation lookup table 280 to produce a suitably scaled curvature profile value to be added or subtracted to the regional approximation.

The interpolation adder/subtractor 286 adds or subtracts the scaled P bit offset 212, padded with zeroes in the most-significant bits, to the N bit regional approximation 232 to produce a final N bit result 234.

Those skilled in the art will recognize that transcendental function approximations performed by the invention may be made as accurate as necessary by careful selection of look-up table sizes and curvature profiles. Part of the contents of the Regional Approximation Look-Up Table 282 may be directly calculated once the table size has been determined. However, the Q bit profile index 218, the R bit shift count 224, and the contents of the Offset Look-Up Table 282 must be determined empirically using computer methods.

Figure 3A:
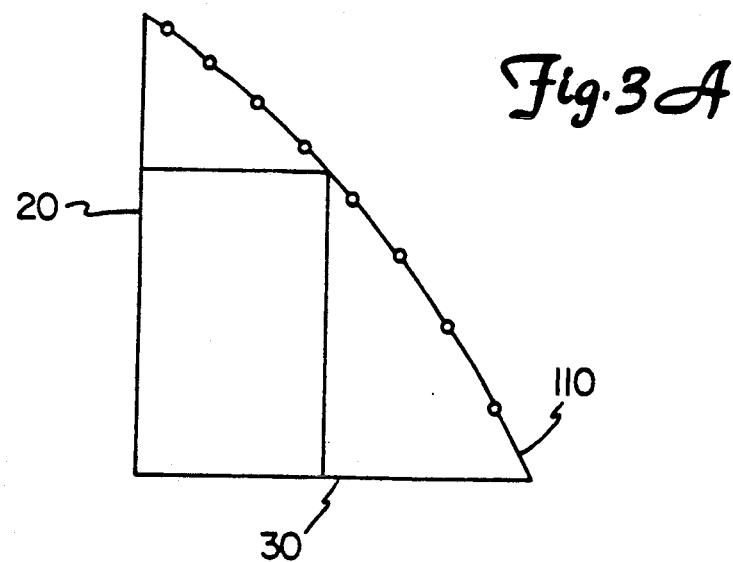
FIGS. 3A-3B show examples of the method of the invention used to approximate a transcendental function using scaling.
Figure 3B:
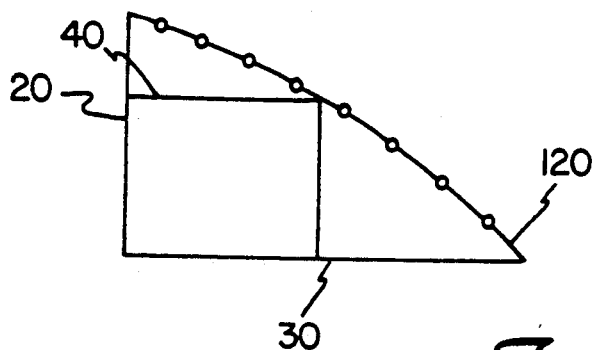

FIGS. 3A–3B show examples of the approximation method of the invention incorporating the reuse of function profiles. The function of the example of FIG. 3 is by way of illustration and not limitation. The function is a slope segment 110 of a transcendental function. This profile provides the information needed to approximate a very gradually sloped segment 120. FIG. 3 shows an example of a slope segment 110 scaled by 0.5 to yield slope segment 120. In this example the profile is a very good fit for the segment just below 45 degrees. Thus, the transcendental function approximation method of the invention provides a way to "reuse" profiles.

Referring again to FIG. 1, after a size for the Regional Approximation Look-Up Table 280 is specified ($L \times M$), a numerical analysis must be performed to determine the number of curves and the shape of the curves in the Curve Profile Look-Up Table. This analysis will compare an N bit Regional Approximation 232 with an actual N bit result for every possible value that can be attained within a segment. This process is repeated for every segment along the transcendental function curve. The differences between the two values are used to determine the number of curves within the Curve Profile, ($2^Q$), and the size of the Offset Data, (P bit). This process will create a curve for every segment along the transcendental function. These curves are used as an initial value for the empirical numerical analysis of FIG. 4.

For example, if the Regional Approximation 232 is f(x) and the actual function values within a segment are: ($f(x)+c0$, $f(x)+c1$, ... $f(x)+cn$), then a curve profile can be assumed that will contain P bit Offset 212 Data of: $y=\{c0, c1, ..., cn\}$. The Offset Data can represent an increasing curve, a decreasing curve, or a curve with a local minimum or maximum point. The curves of each segment are compared for similarity.

Once the N bit Regional Approximations 232, a Q bit Curve Profile Indicia, and P bit Offset Data 212 have been generated, the R bit Scaling Shift Count 224, and Q bit Index 218 can be determined for each segment. An interpolated N bit result 234 is generated for each attainable result within a segment by adding the N bit Regional Approximation 232 to a Scaled P bit Offset value. An error is calculated by taking the difference of the interpolated result and the actual N bit result. This process is repeated for every Scaled P bit Offset value.

The Scaled P bit Offset value are generated by shifting, (MSB to LSB), one bit at a time. An RMS value of all errors for a segment will be calculated. The Q bit Curve Index and R bit Scaling Shift Count that generates the smallest RMS error without any individual error exceeding the bit error constraint will be used.

The results may show that some Curve Profiles are not used. This may occur if it is similar to another Scaled Curve Profile. If a curve can be approximately achieved by scaling the Offset Data of another curve, it need not be included in the set of Curve Profiles. The advantages and disadvantages of keeping another curve in the Curve Profile and shifting less bits or omitting the curve from the Curve Profile and shifting more bits must be weighed.

If the errors meet all constraints, then the numerical analysis is completed and all needed data has been generated. If not, many actions could be taken. Firstly, a new curve could be added to the Curve Profile. Secondly, the P bit Offset Data 212 representing a curve could be modified. Or thirdly, the Regional Approximation Look-Up Table 280 could be re-partitioned so that the Regional Approximations have finer resolution, (increase N). After any action is taken, the process must be repeated from that step.

Those skilled in the art will appreciate that because the calculations and approximations involved are inherently combinatorial, pipeline registers can be used to improve the effective throughput of the approximator. By using computer numerical analysis, tradeoffs can be determined about the number of segments needed, the number of offsets needed, the number of profiles needed and the potential re-use of predetermined profiles using scaling. The numerical analysis considers many factors including the shape of the transcendental function and the desired fixed accuracy to be achieved. The number of segments needed impacts the size of the regional approximation lookup table. The number of offsets needed impacts the size of the P bit offset computed as N-L in FIG. 2.

Figure 4:
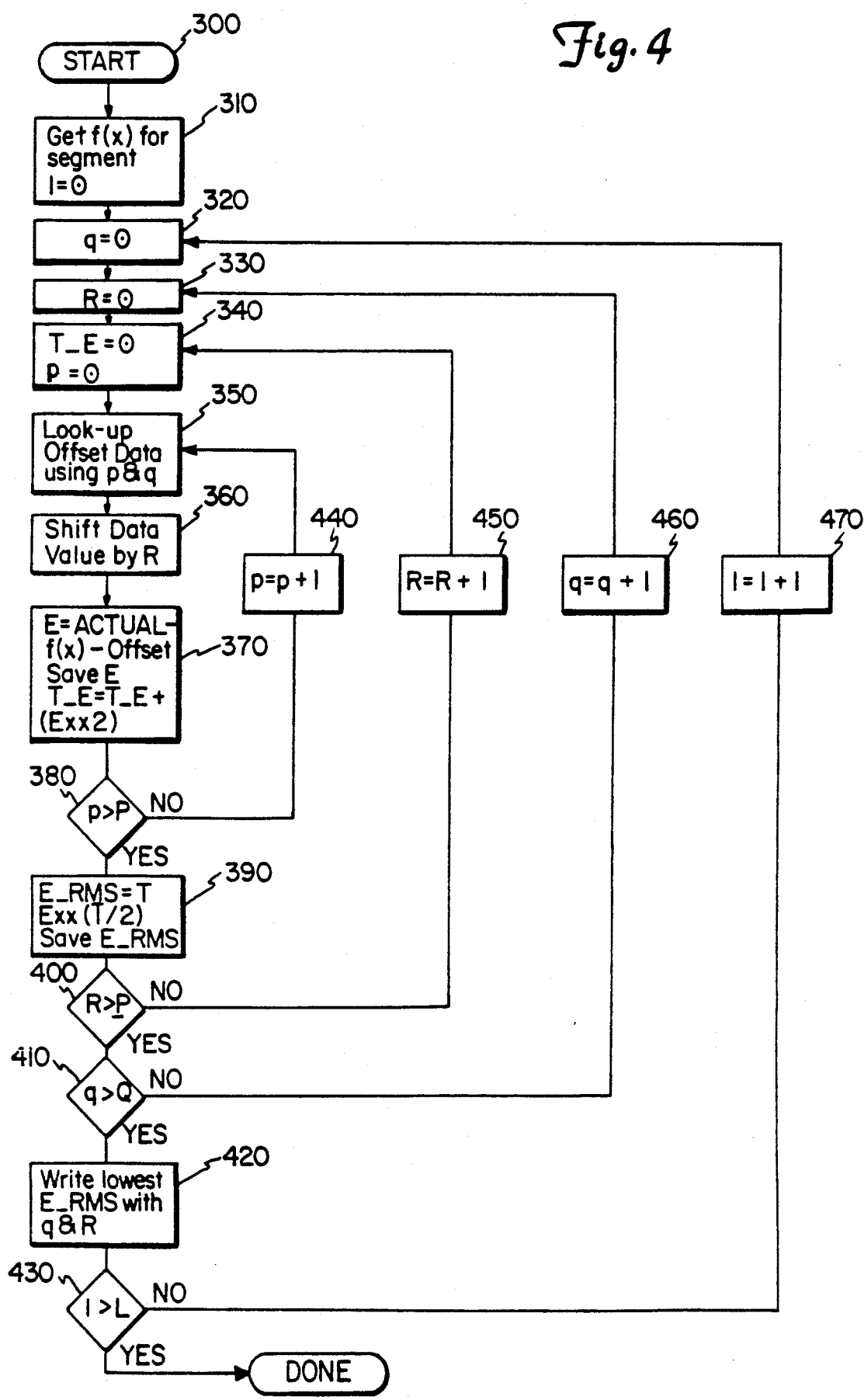
FIG. 4 shows a schematic flow chart of the numerical analysis of the method of the invention.

The numerical analysis method of the invention is shown in FIG. 4 as the empirical analysis flowchart. The state variables used in the analysis are:

L—the number of regional approximation look-up address bits
I—the index variable for L
Q—bits needed to represent the curve profile indicia
q—index variable for Q
R—number of bits to represent the scale shift count
P—number of bits to represent the offset data
p—index variable for P
E—error representing the actual result—interpolated result
T_E—Total Error—The sum of the squares of all errors in a segment for a given scaled curve
E_RMS—RMS value of all E's in a segment for a given scaled curve The approximator begins 300 by getting f(x) for the segment 310. I is set to zero 310. Q is set to zero 320. R is set to zero 330. T_E is set to zero and p is set to zero 340. The approximator then looks up the offset using p and q as an index 350. The data value returned is then shifted by R 360. E is then computed as the ACTUAL value minus the function value f(x) minus the offset value 370. E is saved and T_E is computed as the old value of $T\_E+E^2$ 370. P is checked against p 380, if p>P then the process flows to 390, otherwise the process flows to 440 where p is incremented. After p is incremented 440 the process flows to 350. E_RMS is computed as the square root of the total error T_E ** ½, the E_RMS value is saved 390. The process then flows to 400 where R is checked against P; if R is greater than P then the process flows to 410, otherwise the processes increments R 450. After R is incremented 450 the process flows to 340. Q is then checked against q 410, if q>Q the lowest E_RMS is recorded with q and R 420 otherwise q is incremented, after q is incremented the process flows to 330. The process then flows to 430 where I is checked against L 430. If I is greater then L then the process is done 480, otherwise the process flows to 470 where I is incremented. After I is incremented the process flows to 320.

This invention has been described herein in considerable detail in order to comply with the Patent Statutes and to provide those skilled in the art with the information needed to apply the novel principles and to construct and use such specialized components as are required. However, it is understood that the invention can carry out specifically different equipment and devices, and that various modifications, both by equipment details and operating procedures, can be accomplished without departing from the scope of the invention itself.

What is claimed is:

1. A function approximation method wherein the function is evaluated over a domain comprising a plurality of the domain wherein each element of the domain is addressable by a unique N bit function argument wherein the function approximation method comprises the steps of:
   (a) dividing each N bit function into a L most significant bit argument and a P least significant bit offset argument for each element of the domain;
   (b) storing an N bit regional approximation of the transcendental function, a Q bit profile index, and an R bit offset shift count, in a regional approximation lookup table for each L most significant bit argument wherein the regional approximation lookup table is addressed by the L most significant bit argument for each of the plurality of elements of the domain;
   (c) concentrating the P least significant bit offset argument with the Q bit profile index to arrive at a P+Q bit address for each of the plurality of elements of the domain;
   (d) storing a P bit offset value and a sign magnitude value in an offset lookup table for each P least significant bit offset argument wherein the offset lookup table is addressed by the P+Q bit address for each set of $2^P$ elements for each one of the plurality of elements of the domain; and
   evaluating the value of the function at any one of the plurality of elements of the domain.

2. The function approximation method of claim 1 wherein the step of evaluating the value of the function at any one of the plurality of elements of the domain comprises the steps of:
   (a) dividing the N bit function argument representing the one of the plurality of elements of the domain into a L most significant bit element argument and a P least significant bit element argument wherein the concatenation of the L most significant bit element argument and the P least significant bit element argument results in the N bit function argument representing the one of the plurality of elements of the domain;
   (b) accessing the regional approximation lookup table with the L most significant bit element argument to generate an N bit element regional approximation of the transcendental function, a Q bit element profile index, and an R bit element offset shift count;
   (c) concatenating the P bit element offset with the Q bit element profile index to arrive at a P+Q bit element offset lookup table address;
   (d) accessing the offset lookup table with the P+Q bit element offset lookup table address to generate a P bit element offset value and an element sign magnitude value;
   (e) scaling the P bit element offset value by shifting the P bit element offset value right by the number of bits represented by the R bit element offset shift count to generate the P bit data value;
   (f) forming a signed P bit data value from the element sign magnitude value and the P bit data value; and
   (g) adding the N bit element regional approximation to the signed P bit data value to generate the N bit result.

3. The function approximation method of claim 2 wherein there is a target level of error for the function approximation method and the number of set elements are reduced by exhaustively checking each set element for each element of the domain by the steps comprised of:
   (a) precisely determining a function value for each set element for each one of the plurality of elements of the domain and storing the precise function reduction value in a precise function reduction value memory;
   (b) repeating the method of claim 1 steps (a) through (e) for each set element of each element of the domain and storing the N bit result for each set element of each element of the domain and in a reduction approximation memory;
   (c) comparing the value of the precise function reduction value memory with the reduction approximation memory for each element of the domain and computing a level of error; and
   (d) exhaustively searching all offsets for each set of elements for all elements of the domain and repeating steps (a) through (c) and eliminating any redundant offsets or shifts until the level of error is exceeds the target level of error.

4. The function approximation method of claim 1 wherein there is a target level of error for the function approximation method and wherein the number of bits designated for the L most -significant bit argument and the P most significant bit argument is determined by the steps comprised of:
   (a) heuristically determining a P bit length and an L bit length;
   (b) precisely determining a function value for each element of the domain and storing the precise function value in a precise function value memory;
   (c) repeating the method of claim 1 steps (a) through (e) for each element of the domain and storing the N bit result in an approximation memory;
   (d) comparing the value of the precise function value memory with the approximation memory for each element of the domain and computing a level of error; and
   (e) changing the values of P and L and repeating steps (a) through (d) until the level of error is less than the target level of error.

5. The function approximation method of claim 1 wherein there is a target level of error for the function approximation method and wherein the number of bits designated for the Q bit element profile index and the R bit element offset shift count is determined by the steps comprised of:
   (a) initializing the value of Q to L;
   (b) initializing the value of R to zero so as to substantially provide a unique value from the offset lookup table for every element of the domain;
   (c) precisely determining a function value for each element of the domain and storing the precise function value in a precise function value memory;
   (d) repeating the method of claim 1 steps (a) through (e) for each element of the domain and storing the N bit result in an approximation memory;
   (e) comparing the value of the precise function value memory with the approximation memory for each element of the domain and computing a level of error; and
   (f) changing the values of Q and R and repeating steps (b) through (d) until the level of error is less than the target level of error.

6. The function approximation method of claim 1 wherein there is a target level of error for the function approximation method and wherein the values stored in the offset lookup table are determined by the steps comprised of:
   (a) precisely determining a function value for each set of $2^P$ elements for each one of the plurality of elements of the domain and storing the precise function value in a precise function profile value memory;
   (b) determining a middle value for each set;
   (c) determining the precise difference values by calculating the difference between the middle value and each of the set elements and storing them in a precise difference memory;
   (d) determining the element sign magnitude value to be positive if the precise difference is positive or determining the element sign magnitude value to be negative otherwise;
   (e) determining the value of each set element that is to be stored in the profile lookup table to be the precise difference value rounded to the Pth bit.

7. The function approximation method of claim 1 wherein the function is a transcendental function.

8. The function approximation method of claim 1 wherein the size of the offset lookup table is $2^{P+Q}$.

9. The function approximation method of claim 1 wherein the size of R is no greater than the log of P base 2.

10. The function approximation method of claim 1 wherein the data values are pipelined.

11. A function approximation apparatus wherein the function is evaluated over a domain comprising a plurality of elements of the domain wherein each element of the domain is addressable by a unique N bit function argument wherein the function approximation apparatus comprises:
   (a) a means for dividing each N bit function argument into a L most significant bit argument and a P least significant bit offset argument for each element of the domain;
   (b) a means for storing an N bit regional approximation of the transcendental function, a Q bit profile index, and an R bit offset shift count, in a regional approximation lookup table for each L most significant bit argument wherein the regional approximation lookup table is addressed by the L most significant bit argument for each of the plurality of elements of the domain;
   (c) a means for concatenating the P least significant bit offset argument with the Q bit profile index to arrive at a P+Q bit address for each of the plurality of elements of the domain;
   (d) a means for storing a P bit offset value and a sign magnitude value in an offset lookup table for each P least significant bit offset argument wherein the offset lookup table is addressed by the P+Q bit address for each set of $2^P$ elements for each one of the plurality of elements of the domain; and
   (e) means for evaluating the value of the function at any one of the plurality of elements of the domain.

12. The function approximation apparatus of claim 11 wherein the function is a transcendental function.

13. The function approximation apparatus of claim 11 wherein the size of the offset lookup table is $2^{P+Q}$.

14. The function approximation apparatus of claim 11 wherein the size of R is no greater than the log of P base 2.

15. The function approximation apparatus of claim 11 wherein the data values are pipelined.

16. The function approximation apparatus of claim 11 wherein the means for evaluating the value of the function at any one of the plurality of elements of the domain comprises:
   (a) a means for dividing the N bit function argument representing the one of the plurality of elements of the domain into a L most significant bit element argument and a P least significant bit element argument wherein the concatenation of the L most significant bit element argument and the P least significant bit element argument results in the N bit function argument representing the one of the plurality of elements of the domain;
   (b) means for accessing the regional approximation lookup table with the L most significant bit element argument to generate an N bit element regional approximation of the transcendental function, a Q bit element profile index, and an R bit element offset shift count;
   (c) a means for concatenating the P bit element offset with the Q bit element profile index to arrive at a P+Q bit element offset lookup table address;
   (d) a means for accessing the offset lookup table with the P+Q bit element offset lookup table address to generate a P bit element offset value and an element sign magnitude value;
   (e) a means for scaling as P bit element offset value by shifting the P bit element offset value right by the number of P bits represented by the R bit element offset shift count to generate the P bit data value;
   (f) a means for forming a signed P bit data value from the element sign magnitude value and the P bit data value; and
   (g) a means for adding the N bit element regional approximation to the signed P bit data value to generate the N bit result.

17. The function approximation apparatus of claim 16 wherein there is a target level of error for the function approximation apparatus and the number of set elements are reduced by exhaustively checking each set element for each element of the domain by the apparatus comprised of:

(a) a means for precisely determining a function value for each set element for each one of the plurality of elements of the domain and storing the precise function reduction value in a precise function reduction value memory;

(b) a means for evaluating the value of the function for each element of each set of the domain and storing the N bit result for each set element of each element of the domain in a reduction approximation memory;

(c) a means for comparing the value of the precise function reduction value memory with the reduction approximation memory for each element of the domain and computing a level of error; and (d) a means for exhaustively searching all offsets for each set of elements for all elements of the domain while eliminating any redundant offsets of shifts until the level of error exceeds the target level of error.

18. The function approximation apparatus of claim 11 wherein there is a target level of error for the function approximation apparatus and wherein the number of bits designated for the L most significant bit argument and the P most significant bit argument is determined by an apparatus comprising:

(a) a means for heuristically determining a P bit length and an L bit length;

(b) a means for precisely determining a function value for each element of the domain and storing the precise function value in a precise function value memory;

(c) a means for evaluating the value of the function for each element of the domain and storing the N bit result in an approximation memory;

(d) means for comparing the value of the precise function value memory with the approximation memory for each element of the domain and computing a level of error; and (e) a means for changing the values of P and L until the level of error is less than the target level of error.

19. The function approximation apparatus of claim 11 wherein there is a target level of error for the function approximation apparatus and wherein the number of bits designated for the Q bit element profile index and the R bit element offset shift count is determined by the steps comprised of:

(a) a means for initializing the value of Q to L;

(b) a means for initializing the value of R to zero so as to substantially provide a unique value from the offset lookup table for every element of the domain;

(c) a means for precisely determining a function value for each element of the domain and storing the precise function value in a precise function value memory;

(d) a means for evaluating the value of the function for each element of the domain and storing the N bit result in an approximation memory;

(e) a means for comparing the value of the precise function value memory with the approximation memory for each element of the domain and computing a level of error; and (f) means for changing the values of Q and R until the level of error is less than the target level of error.

20. The function approximation apparatus of claim 11 wherein there is a target level of error for the function approximation apparatus and wherein the values stored in the offset lookup table are determined by an apparatus comprised of:

(a) a means for precisely determining a function value for each set of $2^P$ elements for each one of the plurality of elements of the domain and storing the precise function value in a precise function profile value memory;

(b) a means for determining a middle value for each set;

(c) a means for determining the precise difference value by calculating the difference between the middle value and each of the set elements and storing them in a precise difference memory;

(d) a means for determining the element sign magnitude value to be positive if the precise difference is positive or determining the element sign magnitude value to be negative otherwise; and (e) a means for determining the value of each set element that is to be stored in the profile lookup table to be the precise difference value rounded to the Pth bit.

* * * * *

UNITED STATES PATENT AND TRADEMARK OFFICE
CERTIFICATE OF CORRECTION

PATENT NO. : 5,224,064
DATED : Jun. 29, 1993
INVENTOR(S) : Matthew R. Henry, et al It is certified that error appears in the above-indentified patent and that said Letters Patent is hereby corrected as shown below:

Col. 1, Line 62; delete the word "Coordinate" and replace it with -- COordinate --.
Col. 1, Line 62; delete the word "Digital" and replace it with -- DIgital --.
Col. 2, Line 10, after the word "vector" add a -- , --.
Col. 3, Line 47; after the word "approximation" insert -- of --.
Col. 7, Line 25; delete "FIG. 3" and replace it with -- FIGS. 3A and 3B --.
Col. 7, Line 26; delete the word "is" and replace it with -- are --.
Col. 7, Line 29; delete "FIG. 3" and replace it with -- FIGS. 3A and 3B --.
Col. 7, Line 29; delete the word "shows" and replace it with -- show --.

<u>In The Claims</u>
Col. 9, Line 28; after the first word "of" insert -- elements of --.
Col. 9, Line 43; delete the word "concentrating" and replace it with -- concatenating --.
Col. 9, Line 53; before the word "evaluating" begin a new subparagraph and insert -- (e) --.
Col. 10, Line 13; delete the word "value ;" and replace it with -- value; --.
Col. 10, Line 46; delete the word "is".
Col. 12, line 55, delete the letter "P"

Signed and Sealed this

Twelfth Day of April, 1994

*Attest:*

BRUCE LEHMAN

*Attesting Officer*   *Commissioner of Patents and Trademarks*